March 25, 1941.   J. C. NIEMEYER   2,235,898
SURVEYING INSTRUMENT
Filed Jan. 3, 1939   2 Sheets-Sheet 1
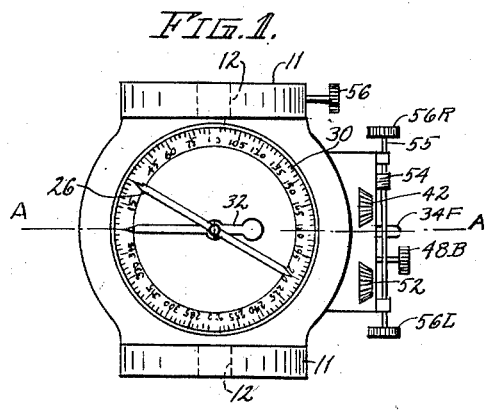
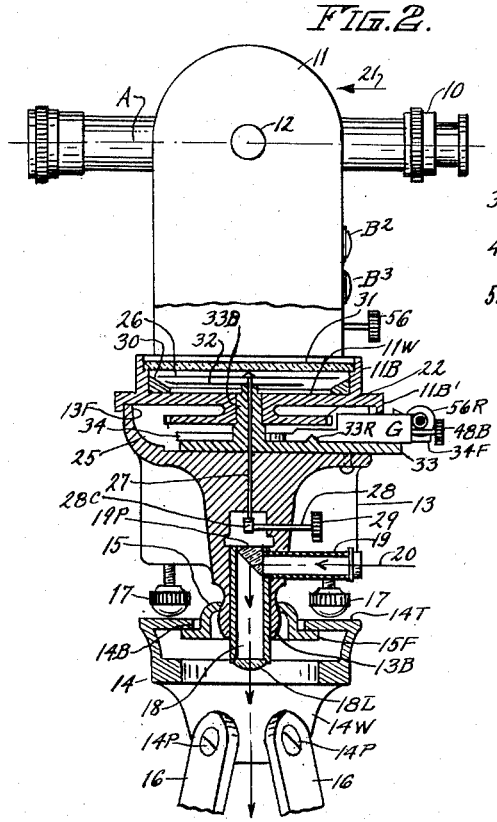
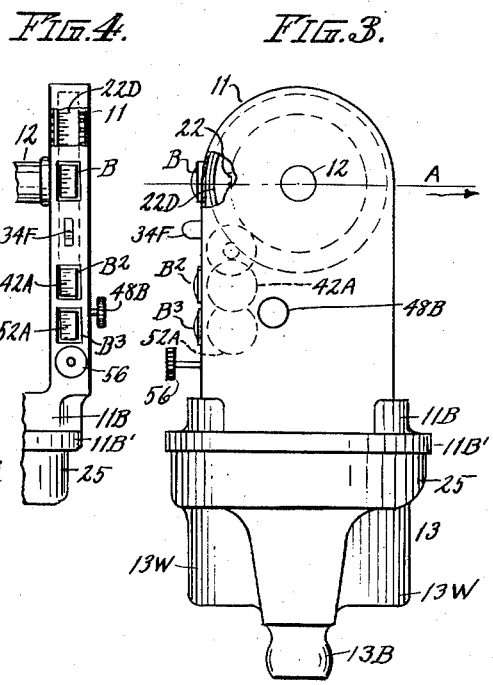
INVENTOR.
James C. Niemeyer
BY David E. Carlsen
ATTORNEY.

March 25, 1941.    J. C. NIEMEYER    2,235,898
SURVEYING INSTRUMENT
Filed Jan. 3, 1939    2 Sheets-Sheet 2
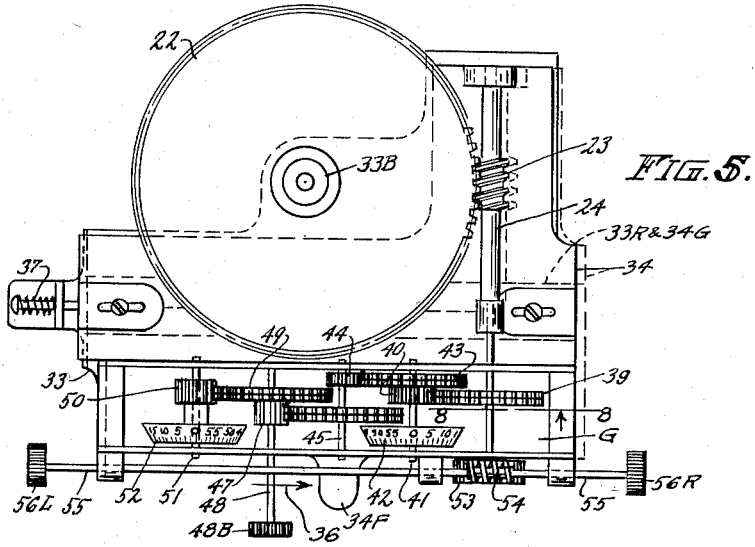
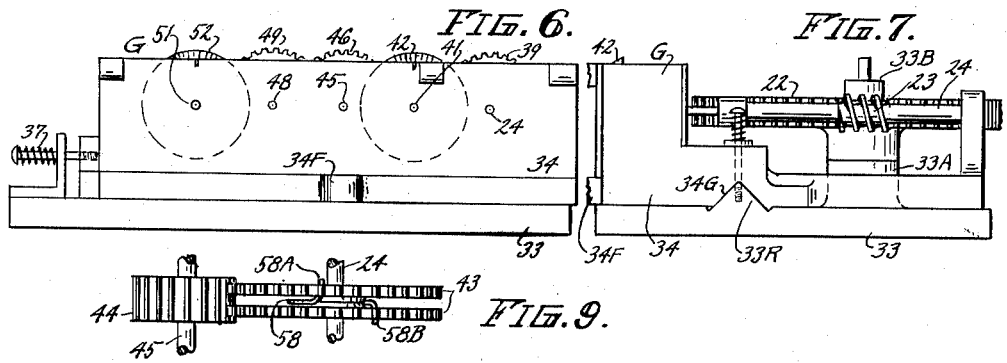
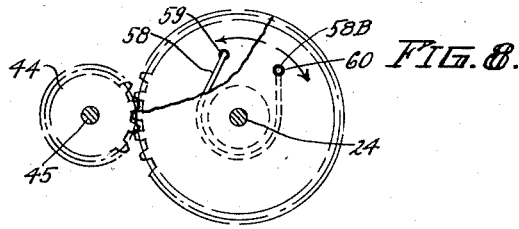
INVENTOR:
James C. Niemeyer
BY David E. Carlsen
ATTORNEY Patented Mar. 25, 1941

2,235,898

UNITED STATES PATENT OFFICE 2,235,898

SURVEYING INSTRUMENT

James C. Niemeyer, St. Paul, Minn.

Application January 3, 1939, Serial No. 249,000

3 Claims. (Cl. 33—69)

My invention relates to a combination surveying instrument, telescopic plumb sighter and precise level. The use of this instrument is threefold and is not limited to surveying purposes but is applicable for a wide field of other uses where precise work is essential to quickly find or determine various angles, planes, levels etc. as in geometric or geodetic work, astronomic calculations, etc. It provides in one instrument means for plumb sighting, a horizontal dial and compass for horizontal readings and vertical dial means for accurate readings of any position of a surveyor's or other telescope. It may also be highly useful in other fields the main object of the invention being to provide an exceptionally accurate plumb sighter horizontal and vertical angle and precise level reading device in a useful combination and on a common central axis which hitherto, as far as I am aware, have not been incorporated in one instrument and with the features of construction herein described.

Referring to the accompanying drawings—

Fig. 1 is a top view of the revolving head or so-called carriage of a surveying instrument embodying my improvements showing the normally horizontal dial of the device and a compass, the so-called "gun" of the instrument being omitted but its longitudinal center line designated A.

Fig. 2 is mainly a vertical sectional elevation of Fig. 1 but showing the gun in level position. This view is a sectional elevation as seen from the left side.

Fig. 3 is a right side elevation of the rotatable carriage of the surveyor's instrument and omitting the gun.

Fig. 4 is a left side or edge view of the near side upright member of Fig. 3 showing certain angle reading means determining angle of the gun.

Fig. 5 is a top view of a preferred embodiment of the dial mechanism of my invention and Fig. 6 is a front view of Fig. 5. Fig. 7 is a right end elevation of Fig. 6. In Figs. 6 and 7 some of the gear rotating means are omitted.

Fig. 8 is an enlarged detail view as on line 8—8 in Fig. 5, illustrating certain constant gear and pinion meshing means, and Fig. 9 is a top view of Fig. 8.

Referring to the drawings by reference numerals, like characters designate corresponding parts in the various views, I have illustrated my device applied to a surveying instrument in which 10 is the usual telescope commonly designated the "gun" pivotally mounted at 12 for oscillation in vertical plane between the two parallel uprights 11 extending vertically from a horizontal base 11B containing a horizontal dial and a compass needle for certain angle readings. Said base 11B may have a circular exterior flange 11B' and is rotatable concentrically on and over the corresponding upwardly directed flange 13F of a lower carriage member designated 13 as a whole. Said member 13 is tapered downwardly in concentric vertical relation to the top 11, to a ball shaped terminus 13B engaged (above its center) by a flanged socket member 15 the circular, exterior flange 15F of which engages the under side of a horizontal web 14T which is a leveling table with a central bore 14B through which the socket member projects upwardly and is capable of limited horizontal adjustment.

The lower part of member 14 comprises a number of radially extending webs to each of which is pivotally connected at 14P a tripod leg 16 in the usual construction of such means well known in the art.

To the lower face of part 15F a cover plate (not shown) may be attached and from the central lowermost part of which may be suspended a plumb bob.

The lower part of the carriage member comprises further a number of radially directed integral webs 13W in each of which is threaded upwardly a headed leveling screw 17 adjustment of which screws sets the upper carriage rigidly with relation to the leveling table. Most of the parts thus far described are more or less common to surveying implements and are well known in the art, but clearly specified herein to make clear the use of my improved means used in combination therewith.

In the lower half of the carriage member 13 is provided a so-called collimator or plumb device comprising a central vertical bore 18 upwardly from the socket ball part 13B. From the upper part of said bore extends outward horizontally a telescope tube 19 and at the intersection of said bores is fixed a "prism" 19P with an angular mirror face. The lower end of bore 18 contains a clear lens 18L with crossed hair-lines (not shown). The operator looking into telescope 19 as in direction of arrow 20 can thus see directly down through tube or bore 13 and adjust the carriage at its ball and socket joint to such position as to bring the crossing of the hair lines to register vertically with any given spot or mark over which the instrument is mounted. Once this vertical positioning is made the entire carriage is automatically set in vertical position over the ball and socket joint and the center of rotation of the gun is also in the common vertical axis line of the carriage and over the plumb sighter described. At this time the gun may be set in true horizontal position to be sighted through in same direction as the plumb sighter (per arrow 21 Fig. 2).

As previously stated the upper carriage (including the gun) is rotatably mounted on the lower carriage part. The lower extremity of said upper carriage part may comprise a horizontal web 11W below which is an integral "degree" gear 22 concentric of said web and normally in mesh with a worm gear 23 on a shaft 24 comprising a primary actuator shaft of a mechanism clearly shown in Figs. 5, 6 and 7. Said mechanism comprises a train of reducing gears, countershafts and minute and second dials for direct and accurate reading of any horizontal position of the gun. Further, this clock-work and angle reading means comprise in general a modified and improved construction of the angle reading means revealed in my United States Patent No. 2,070,675, issued February 16, 1937, subject Triangle protractor.

Referring to Fig. 2 the degree gear 22 shown integral of web 11W of the upper carriage is shown entirely inclosed in a housing comprising the upwardly open end of the lower carriage, said housing designated 25. Within said housing is retained a removable mechanism unit of the type shown in Figs. 5, 6 and 7 said unit comprising in part a number of accessible shaft turning knobs within convenient reach of the operator. The unit shown in Figs. 5, 6 and 7 is particularly adaptable for accurate reading of horizontal angle of the upper carriage but a like unit with necessary modifications in details is mounted within the hollow right-hand upright arm 11 of the upper carriage with angle readings in windows or slots designated B, B2 and B3 at the side or edge of said arm nearest the operator. Said latter readings reveal any position of the gun 10 in vertical plane.

26 in Figs. 1 and 2 is a compass needle pivotally balanced on the upper end of a vertically adjustable pin 27 by means of an eccentric cam 28C on a horizontal shaft 28 the exterior end of which has a turn button 29 accessible to the operator. In Figs. 1 and 2 this compass needle is shown concentric of and over a degree dial ring 30 concentric of and rotatable within a circular housing which may be covered by a glass 31. 32 designates a hand just below the floating compass needle and its point over the degree scale 30, said hand stationary with relation to the base member 33 of my mechanism unit which will now be described.

Referring particularly to Figs. 5, 6, and 7, 33 is an L-shaped base in the inner angle of which is an upright stud 33A with a reduced upper part 33B comprising a bearing for the gear 22 which supports the upper carriage rotatably. The teeth of said gear are normally engaged by the worm gear 23 of shaft 24 which is tangential to the gear and rotatably retained in bearings of an L shaped metal casting 34 superposed on base 33, the said upper casting carrying certain gears, countershafts and secondary dials. The upper casing 34 is slidable (within certain limits) on the lower casting by means of an inverted V-shaped rail 33R integral of and in the upper face of the base said rail engaged by a corresponding downwardly open groove 34G in said upper member, the direction of said rail and groove being at right angles to the direction of the worm-gear and shaft (23—24). The upper member 34 may be provided with an integral outwardly directed finger 34F projecting from the mechanism housing side and contacted by the operator to push the entire part 34 as to the right in Fig. 5 (per arrow 36) and thus the worm gear 23 is brought out of engagement with gear 22 and the upper carriage is free to be oscillated to any desired position in angular relation to the lower carriage part.

Now it will be readily understood that the upper carriage and its telescope, when released as just described, can be moved to any desired angle, either relative to the needle compass or to the position of the hand 32 and the variance in angles readily observed and read under the telescope. In Fig. 1, for example the gun position is indicated at 0— on the degree scale but the compass needle points to 30° and therefore in this instance the gun is directed 30° to the left of the north position of the compass needle.

It is possible too, to adjust the head for true north position by first setting the dial ring 30 with its 0 mark to register with the compass needle (magnetic north) then rotate the head an amount in minutes and seconds according to any known angle of declination which determines true north position and from which position any other relative position may be accurately determined and read.

This device comprised further means for reading exact angles between any two degree markings, down to minutes and seconds. It may be assumed for example that desired position of the gun to register with a certain distant object must be between 30 and 31 degrees to the right of true north. The operator merely releases the worm and gear (22—23) from contact and holds them disengaged until hand 32 registers with 30 on the degree ring 30, then the operator releases pressure on 34F and a compression coil spring 37 at the rear of the casting 34 causes the latter to be sprung back and the worm 23 again engages the gear 22, then the operator causes worm gear 23 to be rotated, turning gear 22 until the gun is positioned in exact position.

The large gear 22 may have 360 teeth so that when it is free to rotate to a certain degree mark it will always be properly reset in mesh with the worm and thus locked in place when said two parts are again engaged.

The means for reading minute and seconds between any two degrees comprises a train of properly proportioned gears and pinions on countershafts parallel to shaft 24 and within a housing G at the front of the unit and on the upper member 34 thereof.

In Fig. 5, 39 is a gear on shaft 24 meshing with a pinion 40 on a shaft 41 which latter carries an angular faced or frusto-conic dial 42 divided into 60 to denote minutes of a degree.

Shaft 41 carries another gear 43 meshing with another pinion 44 on a shaft 45 on which is a gear 46 meshing with a pinion 47 on a shaft 48. A gear 49 on shaft 48 meshes with a pinion 50 on a shaft 51 which carries another frusto-conic dial 52 carrying markings indicating seconds of a minute. The dials 42 and 52 are synchronized as to position, to show 00— when worm 23 and gear 22 are positioned exactly relative to a degree mark. 53 is an auxiliary gear on shaft 24, in mesh with a worm 54 on a shaft 55 having two turn buttons 56R and 56L, said shaft 55 retained in suitable bearings in the front wall of the gear housing. Now it will be readily understood that if it is desired to set the gun 10 at an angle of say 30° 10′ 15″, the operator first sets the upper carriage at the 30 degree mark then re-meshes or re-contacts gear 22 and assuming that the minute and second dials are at this time set at 0—0. Then the operator turns the button 56R or 56L causing rotation of the train of gears, worm 54, gears 53 and 39, etc., simultaneously of course turning the secondary dials 42—52 and until the minute dial (42) reads 10 and the second dial (52) reads 15, at the top.

48B is an auxiliary turn button shown on shaft 48 but may be on shaft 45, for the purpose of quickly setting the minute and second dials to any desired position or 0—0 positions.

In Figs. 1 and 2 a mechanism unit of the kind just described is shown positioned under and in connection with the horizontal dial, for horizontal angle readings, determining the position of the gun horizontally. In Figs. 3 and 4 is shown how the same type of mechanism unit is incorporated (with modifications) to read or determine any angular position of the gun in vertical plane, said means embodied in the right hand upright 11 of the upper carriage. Said upright 11 is of hollow construction and contains one of the mechanical units such as illustrated in Figs. 5–7 in vertical plane and the following necessary changes of construction made. The gear 22 and its degree dial 22D corresponding to dial 30 are retained on the pintle 12 of the gun, said dial comprising a wheel on the outer face of which is made the degree markings seen through the slot B (see Fig. 4). Likewise instead of conic shaped dials such as 42—52, this device has two corresponding dials 42A and 52A with markings on their perimeter for minutes and seconds, respectively. and said markings readable in slots B2 and B3 (Fig. 4). The disengaging lever 34F projects out of the housing in the same face of the upright (nearest the operator). Thus the operator can make and obtain absolutely correct reading of any angle in which the gun may be or may set the gun at any desired angle. Because of the limitation of swinging scope of the gun it is only necessary to have the circular markings on dial 22D read for a maximum of 180 degrees, precise level being read 0—0 on the dials or set to said position after plumb positioning.

It will now be readily understood that the above described angle reading and instrument adjusting means for horizontal and vertical readings, combined with the plumb sighter described, comprise and provide a highly useful triple purpose instrument, the sighting, readings, and adjustments of which are efficiently and accurately accomplished by an operator standing in the usual position to operate the main telescope.

All adjustment means are within easy reach and all degree, minute and second readings in clear view. Variations in details of structure may be made, for example such as providing magnifying lenses in the slots or windows, and hairlines on said lenses to register with the desired or required lines on the dials.

It is obvious that this type of instrument requires very accurately cut gears for obtaining absolutely accurate readings and positioning. The proportions of the gears and pinions need not herein be specified as it is merely a mechanical detail, but I have provided a unique constant mesh and silent gear and pinion construction which is particularly adaptable for this precision instrument, said means illustrated in Figs. 8 and 9.

Each gear, as 43 in Fig. 9, comprises two identical gears, one fixed and the other loose on shaft 24, both meshing as one gear with the pinion 44 on shaft 45. The two gear members are spaced apart slightly and between them is placed a horse-shoe shaped wire spring 58 the rounded part of which surrounds shaft 24 and the two arms extend toward the perimeter of the two gears, said arms normally having a spreading action. The extremity of one arm comprises an integral finger terminus 58A retained in an aperture 59 of one gear part and the other arm has an oppositely directed integral finger 58B retained in an aperture 60 in the other gear. Thus it will be readily understood that with the two gear parts normally being pressed in opposite directions, while their teeth mesh with pinion 44, will thus maintain constant contact with all surfaces of the teeth of said pinion while in mesh, regardless of direction of rotation. The result is a silent and efficient gear and pinion meshing condition and a reduction of wear and tear on both the pinions and gears.

It will be readily understood that the main purpose of the means for disengaging the secondary readings means from the primary or main gear is to reduce the necessary amount of rotation of the train of gears for minute and second readings, because of the necessary stepped up gear and pinion ratios. In other words the main gear 22 (whether keyed to the gun pintle or the upper carriage) is readily adjusted from any one initial degree to another degree near or nearest to the required angle while disconnected, and then re-connected to the train of gears as described and further manipulation by means of the turn buttons provides for further rotation of the main gear until the exact minute and second desired or required is attained.

The use of my triple purpose instrument and its precise action and advantages as embodied in one instrument and by an operator without changing his position, have been fully disclosed simultaneously in the above description of its construction.

I claim:

1. In a surveying instrument precise level and telescopic plumb sighter, an upper carriage with a telescope mounted therein and oscillatable in a normally vertical plane, a lower carriage on which said upper carriage is mounted for rotation in normally horizontal plane, said carriage members comprising a head in fixed alinement on a common upright axis, a tripod or the like below said head and the head of said tripod comprising in part a leveling table, a ball and socket joint in said latter head of which the ball comprises the lower extremity of the lower carriage and the socket comprises in part a flanged member retained by said leveling table and adapted for limited horizontal adjustment, headed screws retained in the lower side of the lower carriage and engaging the leveling table to set the head in fixed relation to the tripod, a right angled plumb sighting device in said lower carriage comprising a horizontal telescope directed radially therefrom and a vertical, downwardly directed tube central of the lower carriage, a vertically disposed dial and indicator means operatively connected with the pintle of the main telescope and dial and indicator means readable in horizontal direction mounted in concentric relation to the axis of the upper carriage, said first dial means for indicating position of the telescope in vertical plane and said latter dial means for indicating horizontal direction of the upper carriage and its telescope and in automatically vertical alinement with the plumb sighting means described.

2. A dial hand manipulating device comprising in combination with a circular dial disc, a dial gear concentric of said dial and a hand fixed concentric of the hub of said gear, said device comprising an L-shaped base with an upright stud within its angle and comprising a bearing for said dial gear, an upper L-shaped frame superposed on said base, a worm gear and shaft on said upper frame in horizontal plane and tangential to the dial gear, said upper frame mounted for reciprocal movement on the base and spring-pressed in a direction to mesh said worm and the dial gear, means for moving said upper frame to disengage the gear and worm, a mechanism housing in said upper frame comprising a train of gears and pinions, all in vertical plane and rotatably mounted on countershafts and rotatably connected with said worm shaft, secondary dials on predetermined ones of said gear shafts to indicate fractional and subfractional movement of the main dial gear.

3. The structure specified in claim 2, in which the said dial and secondary dials are provided with circularly arranged readings of a predetermined standard and in co-related order, the said main dial and the secondary dials positioned and exposed for reading in spaced relation to each other, and means for rotating the train of gears comprising a primary rotating shaft geared to said worm shaft and having turn buttons, and a secondary shaft comprising an extension of one of said countershafts, between the secondary dials, and provided with a turn button or equivalent.

JAMES C. NIEMEYER.